Jan. 4, 1955
G. V. W. ROTH ET AL
2,698,760
FLEXIBLE CONNECTION
Filed Feb. 28, 1949
3 Sheets-Sheet 1
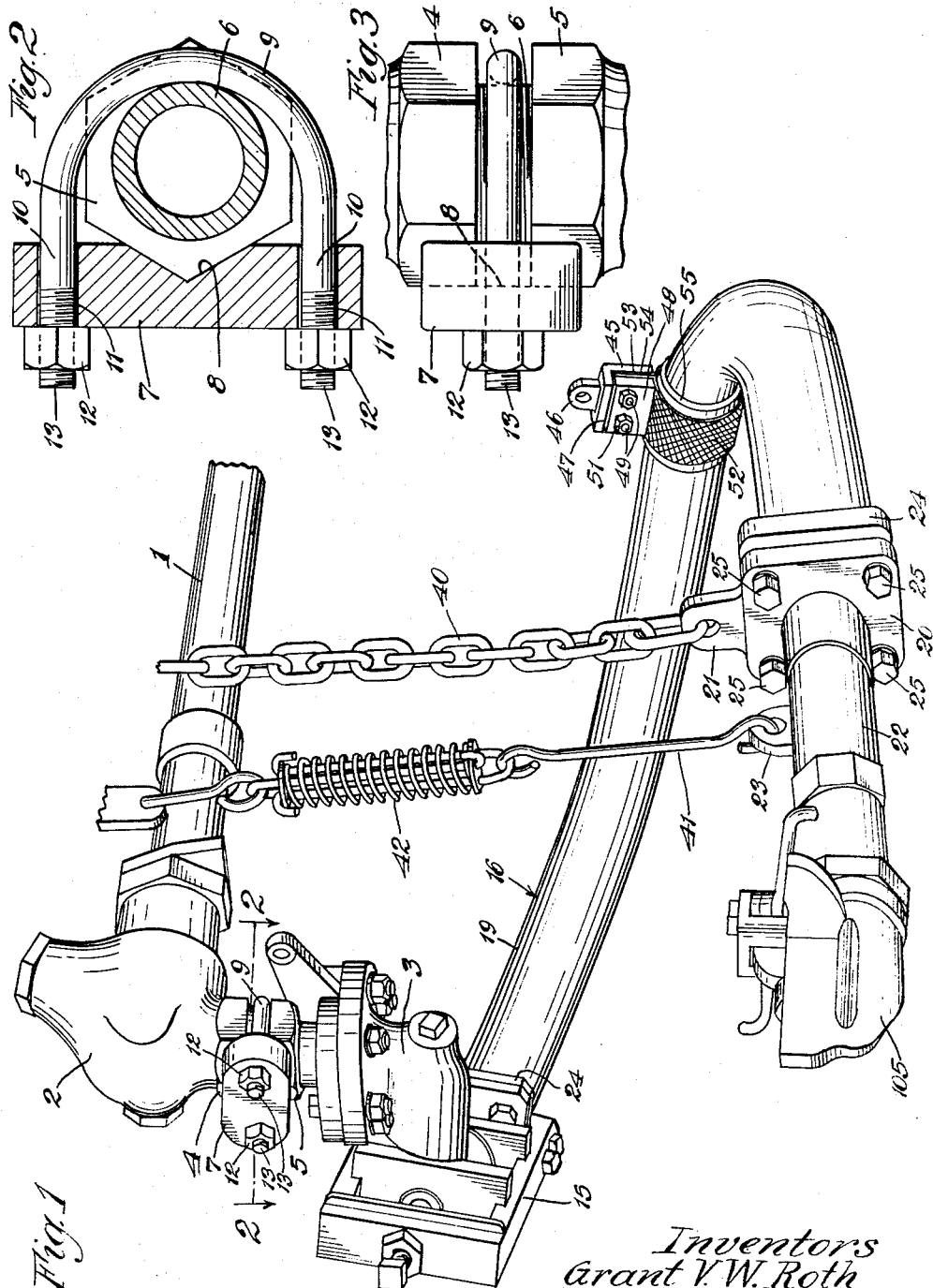
Inventors
Grant V. W. Roth
Stephen Guarnaschelli
by Parker Carter
Attorneys

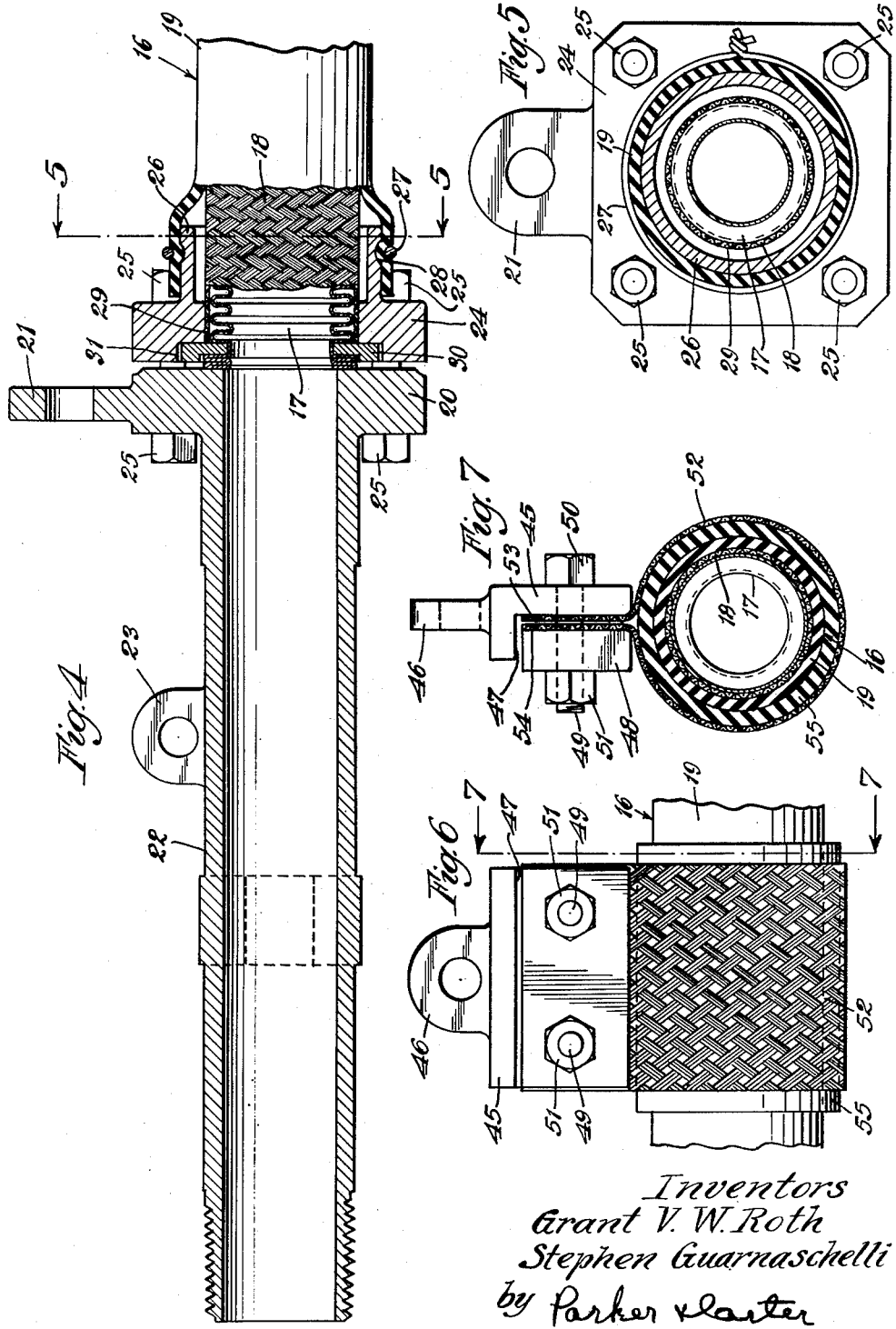

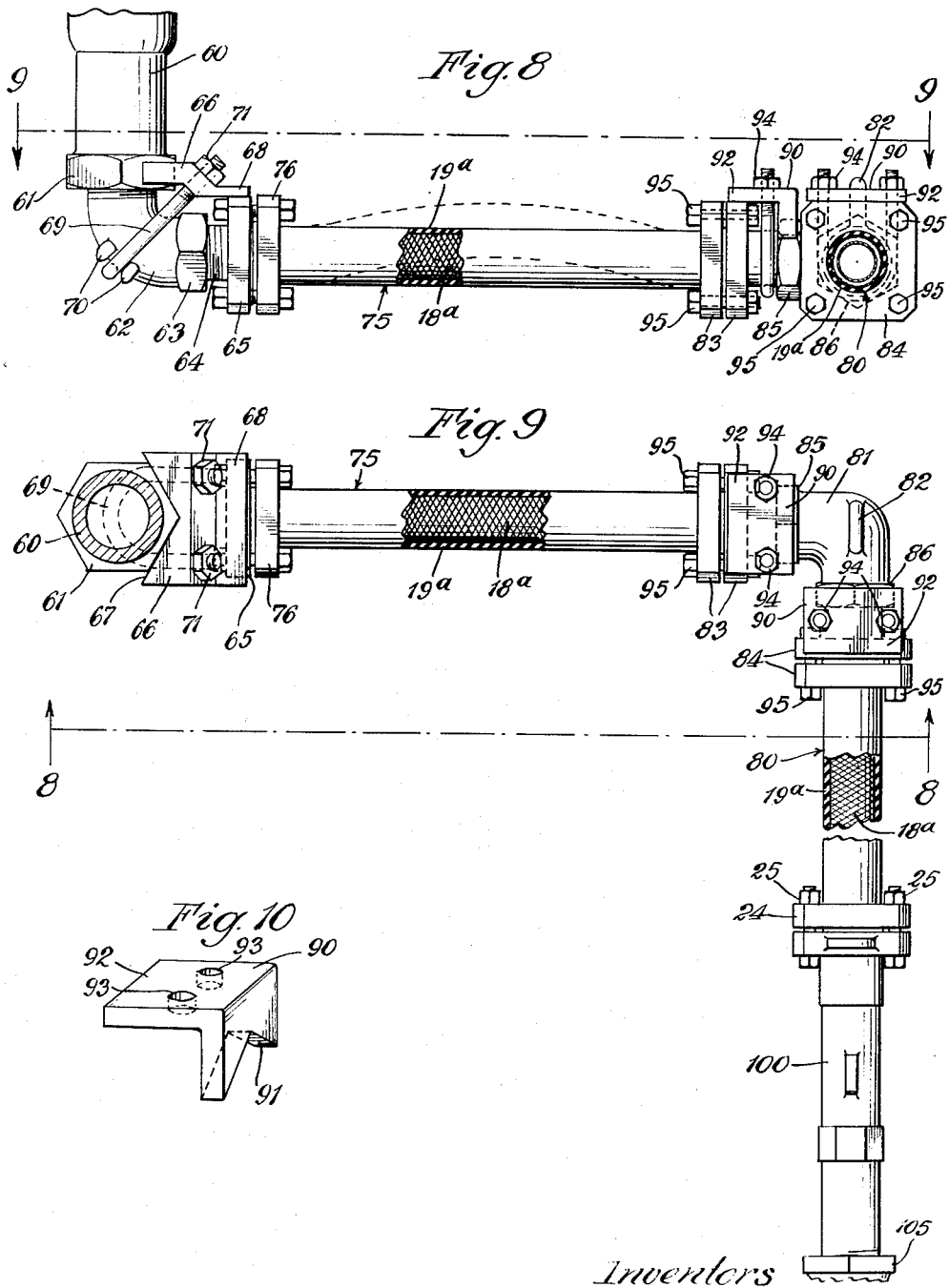

United States Patent Office 2,698,760
Patented Jan. 4, 1955

2,698,760

FLEXIBLE CONNECTION

Grant V. W. Roth, Evanston, Ill., and Stephen Guarnaschelli, Bethany, Conn., assignors to Grant V. W. Roth, as trustee under The Naugatuck Trust Application February 28, 1949, Serial No. 78,872

6 Claims. (Cl. 285—8)

Our invention relates to an improvement in flexible connections, and is shown as applied to steam connections usable between railway cars.

One purpose is to provide improved extendible and flexible steam connections for railway cars.

Another purpose is to provide such connections which will stand rough usage and long wear, with a minimum tendency to deteriorate and leak.

Another purpose is to provide such a connection in which an improved securing or supporting means is employed for supporting a flexible connection between adjacent cars.

Another purpose is to provide an improved adapter for such connections which may be used to connect coupler elements to the flexible hose used between cars.

Another purpose is to provide an improved securing connection for nuts or bolts used between the steam valve and the manifold.

Another purpose is to provide an improved connection between a flexible metal tube and a securing or adapting member, which reduces, to a minimum, the probability of breakage of the metal tube, while preventing leakage.

Our improved securing or supporting means illustrated in Figures 1, 6 and 7 in the present application are described and claimed in our copending application, Serial Number 301,052, filed July 26, 1952.

Other purposes will appear from time to time in the course of the specification and claims.

We illustrate the invention more or less diagrammatically in the accompanying drawings wherein:

Figure 1 is a perspective view;
Figure 2 is a section, on an enlarged scale, on the line 2—2 of Figure 1;
Figure 3 is a side elevation of the structure of Figure 2;
Figure 4 is a longitudinal section through the adapter;
Figure 5 is a section on the line 5—5 of Figure 4;
Figure 6 is a side elevation of a hose support;
Figure 7 is a section on the line 7—7 of Figure 6;
Figure 8 is a section on the line 8—8 of Figure 9, and Figure 9 is a section on the line 9—9 of Figure 8, these two figures illustrating a variant form of our invention; and
Figure 10 is a detail.

Like parts are indicated by like symbols throughout the specification and drawings.

It will be understood that our invention is shown as applied to the steam line of a railroad car. The railroad car is not illustrated, since it forms no part of the present invention, but 1 generally indicates such a steam line shown as terminating in an end valve 2, the details of which do not form part of the present invention. 3 generally indicates a manifold which may be suitably secured to the end valve 2. We illustrate the end valve 2 as including or having a hexagonal nut 4 A corresponding hexagonal nut 5 is secured to or forms part of the manifold 3. 6 is any suitable tube or pipe, externally threaded to enter the internal threads of the nuts 4 and 5. In order to prevent relative rotation of the nuts 4 and 5 we provide a yoke or block 7 which is notched or recessed as at 8 to receive corresponding angular portions of the nuts 4 and 5.

9 illustrates a U-bolt contacting the exterior of the pipe 6 and extending between the nuts 4 and 5. Its opposite ends 10 extend through appropriate apertures 11 in the yoke 7. Locking nuts 12 are positioned on the threaded portions 13 of the ends 11 of the U-bolt. It will be understood that when the nuts 12 are tightened the yoke 7 is urged toward the tube or pipe 6 and receives the angular portions of the nuts 4 and 5. Thus any unintended relative rotation of the two nuts is prevented, since the width of the yoke 7, as shown in Figure 3, is sufficient for it to embrace or receive both nuts. Whereas we have used hexagonal nuts or members, it will be understood that any other suitable, non-circular form may be employed, the yoke, in that event, being recessed to conform.

The manifold 3 includes an assembly 15 adapted to receive an end of the flexible steam pipe 16. The details of the assembly 15 may be the same as those below described in connection with the structure of Figure 4, for securing the adapter flange 20 and the opposed collar 24. The pipe or duct 16 may include an inner member of relatively thin sheet metal, a portion of which is shown in Figure 4, as at 17. It is corrugated, and these corrugations may, if desired, be spiral, although they are not so shown in Figure 4. Surrounding the corrugated sheet metal inner component of the pipe or duct is an intermediate member shown as formed of braided metal, as indicated at 18. Surrounding the intermediate braided metal layer is an outer layer 19 of rubber or a suitable rubber substitute. The tube thus formed extends from the manifold 3 to the adapter flange 20. The adapter flange may be suspended, for example, by any suitable eye 21, and is shown as integral with the adapter body 22. The body may also be suspended or supported by any suitable eye 23. Abutting against the adapter flange 20 is a collar or fitting 24 secured by any suitable bolts or the like 25. The collar 24 has a cylindrical flange or circumferential portion 26 against the exterior of which the outer covering or insulation 19 is secured. This is shown as secured, for example, by a ring or wire 27 which forces it into an external channel 28 on the exterior surface of the sleeve or circumferential portion 26.

The spirally woven flexible hose layer 18 extends through the bore of the sleeve 26 and out of contact with it, but is seated within and does contact the reduced diameter bore 29 of the collar 24, and it is shown as abutting against a retaining washer 30 which is received in an appropriately shaped seat 31 recessed in the collar 24. As best seen in Fig. 4, the fitting 24 has a main axial bore 29 and the circumferential portion 26 has an axial bore of greater diameter than the bore 29. The retaining washer may be of the split-ring or two-part type and may have a central axial bore of less internal diameter than the internal diameter of the main bore 29.

The inner hose layer 17 is shown as having one bend abutting against the outside of the retaining washer 30, and a couple of terminal bends compressed between the opposite side of the retaining washer 30 and the face of the member 20. A positive clamping action is obtained by tightening up the screws or bolts 25, and a very tight seal is thus obtained without, however, affecting the flexibility of the hose, and the convolutions of the hose are not pinched or distorted, and there is, therefore, no tendency for fatigue or weakening at the point or area of attachment. It should be understood that the one in which fatigue might be feared extends broadly from the retaining washer 30 somewhat to the right of the end of the sleeve 26, referring to the parts in the position in which they are shown in Figure 4. In other words, a length of an inch or more constitutes the length of maximum danger.

A tight seal is provided, with an accompanying prevention, or substantial prevention, of fatigue, by providing the above described securing method in connection with the free space within the sleeve 26. Thus a substantial flexure of the connection can take place without a metal to metal contact between the tube itself and the coupling components. Note that there is no non-metallic substance or packing material which can wedge or fill, or in any way hamper the freedom of movement of the metal parts at the point of contact. Note that the non-metallic outer covering 19 is separated from the metal parts throughout the area of maximum fatigue risk, and is separately secured and sealed to the exterior of the sleeve 26.

As is clear from Figure 1, the hose or tube 16 may be suspended from any suitable part of the car with which it is used. For example, we illustrate a chain 40 having a lower link passing through the eye 21, the upper end of the link being secured to any suitable part of the car. The adapter body 22 may be suspended by a link 41 having a lower portion passing through the eye 23. 42 is any suitable spring associated therewith, whereby the adapter may be suspended from the car. The tube 16 may be intermediately supported by the supporting means illustrated in detail in Figures 6 and 7. A supporting body 45 is provided with a supporting eye 46. It is recessed, as at 47, to receive a securing block 48. The two blocks are connected, and may be drawn toward each other, by any suitable bolts 49, headed as at 50, and having threaded portions which receive nuts 51. 52 illustrates a tube surrounding member of flexible material, such as metal mesh, which has ends 53 and 54 which extend between the members 45 and 48, and which may be apertured to permit the passage of the bolts 49.

Surrounding the exterior tube layer 19 is a hanger liner 55 of rubber or a suitable rubber substitute, which is preferably flexible and readily distortable. In the application of the support it will be understood that the inner surface of the liner 55 conforms generally to the exterior surface of the outer layer 19 of the hose or tube, but that the fit is sufficiently snug frictionally to prevent unintended sliding or slippage of the support in relation to the tube 19.

It will be understood that when the interior of the pipe is subjected to pressure there is some degree of outward expansion of the pipe. When the pipe does expand, the hose layer 19 and the hanger or supporting layer 55, being both of material having the characteristics of rubber, do not bind the hose or prevent a reasonable degree of expansion. The outer layer 55 embeds itself in and flows upwardly into the mesh 52, both permitting expansion of the hose and firmly holding the support against relative endwise movement in relation to the hose. On the other hand, the braided component 18 of the hose may embed itself in the inner surface of the hose layer 19, and relative movement of the layer 55 in relation to the hose layer 19 is frictionally prevented. When the pressure is released or reduced, and there is a slight decrease in outer diameter of the pipe, the fit is still snug enough to prevent unintended relative longitudinal movement of the support and the hose.

We find it advantageous to employ hose lengths 16 which, in use, are generally U-shaped. In Figures 8, 9 and 10, however, we illustrate a variant form of the device in which we employ two connecting hose assemblies between each adjacent car, and each assembly including two lengths of flexible hose, the lengths of flexible hose of each such assembly being generally at right angles to each other.

With reference to the details of Figures 8 to 10, 60 is a fitting or connection, which may be part of or may be secured to a manifold, and which includes the nut or hexagonal portion 61. 62 is a pipe elbow having a nut or hexagonal portion 63, screw-threaded to receive the externally threaded duct or pipe 64 having an associated squared portion or non-circular nut element 65. 66 is a locking member or abutment, notched as at 67 to receive and conform to an angular portion of the nut element 61, and having a flat portion or flange 68 conforming to one face of the member 65. It is held in position by a U-bolt 69, the bend of which passes between abutments 70 on the elbow 62. When the locking nuts 71 are tightened the U-bolt 69 holds the members 61 and 65 against relative rotation. 75 indicates a normally rectilinear hose section which may be made like the hose shown in Figure 4, with the inner layer of corrugated sheet metal, not indicated on the drawings, an intermediate layer of woven wire, indicated at 18a, and an outer layer of rubber or a rubber substitute, indicated at 19a. One end of the hose 75 may be suitably secured in relation to the member 65, for example, by the use of a locking element 76, bolted or otherwise secured to the member 65. The details of this connection may be widely varied. For example, an attaching connection, such as is shown in Figure 4, may be employed.

Another hose length 80 is located at right angles to the hose length 75, and may be connected thereto by any suitable elbow 81 with its supporting eye 82 and its hose receiving connections 83 and 84. The elbow or L-fitting 81 has end nut members or hexagonal members 85 and 86 to which the locking units 83 and 84 are held by any suitable tubular connections. Rotation of the elements 83 or 84 in relation to the hexagonal members 85 or 86 is prevented by securing members 90, shown in perspective in Figure 10. Each such member has a notched portion 91 adapted to receive an angular part of the nut 85 or 86. It includes also a flat portion 92 adapted to abut against an edge of one of the components of the members 83 or 84. It is apertured, as at 93, to receive U-bolt ends which are secured by nuts 94. It will be understood that each of the members 83 and 84 includes components connected by suitable bolts 95. At the opposite end of the hose 80 is an adapter 100, which may be identical with the adapter assembly shown at 20 and 22 in Figure 4.

As to both forms of our invention it will be understood that the adapter ends extend to and are secured to any suitable coupler elements, one of which is shown at 105 in Figure 1. It will be understood that two opposed coupler elements complete the coupling assembly between adjacent cars, so far as relates to the hose connection, and that the couplings are engaged and secured with the adapters 22 or 100, generally horizontally located and extending generally transversely across the rails of the track, or across the length of the cars. Since the details of the couplings do not, of themselves, form part of the present invention, they are not herein shown.

It will be realized that, whereas, we have described and illustrated a practical and operative device, nevertheless many changes may be made in the size, shape, number and disposition of parts without departing from the spirit of our invention. We therefore wish our description and drawings to be taken as in a broad sense illustrative or diagrammatic, rather than as limiting us to our precise showing.

The use and operation of the invention are as follows:

The structures above described present some important advantages in connection with railroad products.

In the first place we illustrate a form of hose connection between cars which is efficient and flexible, easily applied and flexibly supported.

As to the specific components, we illustrate in Figs. 5, 6 and 7 a highly efficient method of our structure for supporting flexible hoses. The hanger liner 55, of a rubber-like substance, snugly fits the exterior of the hose layer 19, even when the hose is not distended by internal pressure. Any increase in internal pressure sufficient to expand the exterior of the hose merely causes the metal mesh to become somewhat imbedded in the expanding hanger liner 55. Thus, we not merely prevent unintended slippage but provide a support which does not cramp or damage the tube when the tube or hose is expanded by internal pressure.

The U-bolt 9, with its yoke 7, constitutes a very efficient method of holding non-circular elements such as nuts, against unintended movement or release. This structure is adequately illustrated in Figs. 2 and 3.

Fig. 4 illustrates an adapter structure for the securing of flexible tube or hose elements to adapter bodies such as the adapter 22. Leakage is prevented, but without the necessity of any clamping or confining action against the exterior of the hose which would tend to result in localized wear or fatigue at or near the junction point or connection between the hose and the adapter.

With reference to the structure of Fig. 4, parts 24 and 30 constitute a fitting for receiving the end of the composite tubing or hose 16. The outer layer 19 of the hose is separated from or placed outwardly from the metal mesh layer 18 and is separately secured to the exterior of the flange 26 by the locking ring or wire 27. As will be clear from Fig. 4, there is ample play to admit substantial flexure of the inner portion of the hose before the hose comes in contact with the edge or interior of the flange 26. The inner member of corrugated metal extends through the collar or fitting part 24 and through an additional retaining washer or gripping washer or fitting part 30. The terminal portion of the layer 17 is actually gripped between the washer 30 of the fitting and the opposed abutting face of the adapter flange 20. The nuts or bolts 25 are effective to hold the collar 24, and with it the retaining washer 30 firmly against the adapter flange 20, gripping therebetween the end folds of the layer 17, as shown in Fig. 4. However, the woven mesh layer 18 is not constrained at all and is not subjected to positive clamping action. The result is a joint or connection which is highly advantageous in that it is easily applied, that it is tight, and does not subject any part of the hose to clamping or flexure or strain likely to cause breakage, wear and leakage.

With reference to the chain 40, it performs an important function in addition to its mere supporting function. As a matter of fact, its supporting function is only incidental to its protective function. In the event that couplers are not "broken" when cars are disconnected, any abuse or strain on the metallic hose elements, such as 19, is prevented when the cars are pulled apart after the drawbars are uncoupled. That is to say, since the chain 40 is firmly anchored at one end to the car structure and at another end to the outer end of the flexible conduit, the chain will take the strain or tension, not the metallic or composite hose 19. If the hose 19 were subjected to the tension, it would, in practice, stretch out like an accordion, and become useless. This is particularly the case in view of the employment of an inner layer 17 of folded metal, such as is shown at the right hand end of Figure 4.

The structure of Figs. 8 and 9 represents half of a connection between two adjacent cars. In considering the operation of this structure, assume that the member 60 and its associated parts represent a point of generally fixed attachment to one car and that the member 105 represents part of a connection to another car. The flexible tube 75 may be generally horizontal and at right angles to the length of the train. It is connected by the L 81 and its associated parts to the flexible hose 80, which may be generally horizontal but is arranged along the length of the train. As shown by dotted line in Fig. 8, if the hose 80 is twisted in one direction, flexible hose 75 will bend into the dotted line position of Fig. 8. If the hose 80 is twisted in the opposite direction, it would bend the hose 75 downwardly in an arc opposite to the one shown by the dotted line. It should be kept in mind that the L 81 is flexibly supported and can move in response to the twisting and bending of the two hoses so that it puts no limitation on their movement. In the use of the device in a train, the assembly of Figs. 8 and 9 is secured to a corresponding assembly on another car, the second hose, corresponding to 80, will extend longitudinally along about the same axis as 80, but the cross hose of the other car, corresponding to 75, extends to the right from the axis of 80.

When the floors of two adjacent cars are on the same plane, or are even in parallel planes, then there is no problem of taking up torsional twist. But where the floor levels of the two cars vary so that their planes become transversely or longitudinally inclined, then a problem arises which is admirably solved by my disclosed structure. The flexible steam conduit system of Figs. 8 and 9 freely adapts itself to the torsion caused by the inclinations of the planes of two car floors in relation to each other. Where the result of the car movement is a twist of the longitudinal hose 80 in one direction, this twist is taken up by arching or bending of the transversely extending hoses 75, one arching up and the other down. The fact that the L's 81 are flexibly supported permits the consequent changes in distance between the fittings at the opposite ends of the flexible hoses without causing any difficulty.

We claim:

1. In a flexible conduit connection for railway cars and the like, a rigid metallic elbow connection secured to the end of one of said cars, a normally straight flexible imperforate metallic hose section secured at one end to said elbow against relative rotation therewith and extending transversely of said car, an L-shaped fitting secured to the opposite end of said hose section against relative rotation therewith, said fitting having its openings in a generally horizontal plane which includes said hose section, and a second generally straight flexible metallic hose section secured at one end to said fitting against relative rotation therewith and extending therefrom in said plane outwardly from beneath said car and generally parallel with the longitudinal axis of said car, said fitting and first hose section being flexibly supported beneath said car for movement in all directions in response to flexing and twisting of said second hose section, said fitting and first hose section being supported a sufficient distance beneath said car to permit said first hose section to arc in response to movement of said fitting toward said elbow due to said twisting.

2. In a flexible conduit connection for railway cars and the like, a first generally straight flexible imperforate metallic hose section, an elbow connection for one end of said hose section adapted to be fixed beneath the end of one of said cars, said first hose section being fixedly connected to said elbow and extending from said connection to a generally L-shaped fitting fixedly connected to the terminal end of said first hose section, said L-shaped fitting having its openings lying in a generally horizontal plane which includes said hose, a second generally straight flexible imperforate metallic hose section fixedly connected at one end to said fitting and extending therefrom in the plane which includes said first hose and fitting, a flexible support secured to said fitting to maintain said fitting and first hose section normally in said plane, whereby said fitting is free to move and twist in all directions about said elbow connection in response to flexing and twisting of said second hose section.

3. In a flexible conduit connection between a pair of adjacent railway cars, a coupler positioned between said cars, a pair of generally straight flexible imperforate metallic hoses fixedly connected to said coupler and extending in opposite directions from said coupler generally along the longitudinal axes of said cars and terminating adjacent the opposed ends of said cars, a pair of fittings each fixedly connected to the terminal end of one of said hoses, and movably supported from and beneath one of said adjacent car-ends, said fittings being generally L-shaped and having their open ends lying generally in the plane which includes said hoses, said fittings being free to move in all directions in response to movement of said hose, a second pair of generally straight flexible metallic hoses each fixedly connected at one end to one of said L-fittings and extending therefrom beneath said car-ends in opposite parallel directions transversely of said cars and normally in a horizontal plane, the opposite ends of said second hoses being fixedly connected each to a rigid fitting secured beneath a corresponding car-end.

4. In a securing device for a pair of nut elements spaced on a connection assembly, the nuts having non-circular portions, a block engaging a said non-circular portion on each of said nut elements and means for holding said block in engagement with said non-circular portions, including a U-bolt engaging said connector between said non-circular portions on the side thereof opposite said block, said block being apertured to receive the ends of said U-bolt and clamping means for the ends of the U-bolt engaging the outer surface of said block to draw said block against said non-circular portions.

5. The structure of claim 4 wherein said block comprises a generally flat first portion and a second portion in angular relationship with said first portion, said second portion having a non-circular recessed end edge complementary to one of said non-circular nut portions.

6. A connector fitting assembly for the end of a flexible tubing comprising a fitting having a main axial bore, said fitting having extending axially from one end thereof, backward along the tubing, an integral circumferential portion, said circumferential portion having a second bore in axial alignment with said main bore and having an internal diameter slightly greater than that of said main bore, said fitting having an outwardly open annular recess in the opposite end thereof and a split retaining washer adapted to be placed in said recess and having an axial bore of a diameter less than that of said main bore.

References Cited in the file of this patent

UNITED STATES PATENTS

| Number | Name | Date |
|---|---|---|
| 700,378 | Schmidt | May 20, 1902 |
| 701,272 | Neil | May 27, 1902 |
| 739,097 | Marcy | Sept. 15, 1903 |
| 910,104 | Witzenmann | Jan. 19, 1909 |
| 947,487 | Gold | Jan. 25, 1910 |
| 1,051,046 | Witzenmann | Jan. 21, 1913 |
| 1,119,904 | Vissering | Dec. 8, 1914 |
| 1,149,727 | Carence et al. | Aug. 10, 1915 |
| 1,221,240 | Steidle | Apr. 3, 1917 |
| 1,261,038 | Kerns | Apr. 2, 1918 |
| 1,651,022 | Fulton | Nov. 29, 1927 |
| 1,698,571 | Van Cleve | Jan. 8, 1929 |
| 1,781,457 | Gold et al. | Nov. 11, 1930 |
| 1,805,006 | Neilon | May 12, 1931 |
| 1,816,413 | Way | July 28, 1931 |
| 1,860,422 | Loiseau | May 31, 1932 |
| 1,870,036 | Bruce et al. | Aug. 12, 1932 |

(Other references on following page)

UNITED STATES PATENTS

| | | |
|---|---|---|
| 2,038,117 | Layton | Apr. 21, 1936 |
| 2,059,825 | Talbott | Nov. 3, 1936 |
| 2,150,471 | Van Vulpen | Mar. 14, 1939 |
| 2,229,129 | Riegelman | Jan. 21, 1941 |
| 2,256,388 | Fentress | Sept. 16, 1941 |
| 2,321,434 | Stenzel | June 8, 1943 |
| 2,322,562 | Blanchard | June 22, 1943 |
| 2,455,598 | Michalenko | Dec. 7, 1948 |
| 2,485,975 | Main | Oct. 25, 1949 |
| 2,511,335 | Guarnaschelli | June 13, 1950 |